Oct. 16, 1956 F. W. SCHRAMM 2,767,375
AUTOMATIC METER CALIBRATOR
Filed Dec. 9, 1952 7 Sheets-Sheet 1
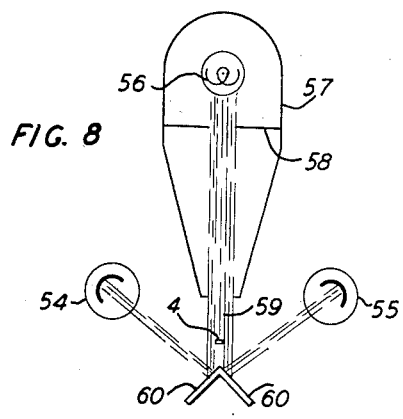
FIG. 8
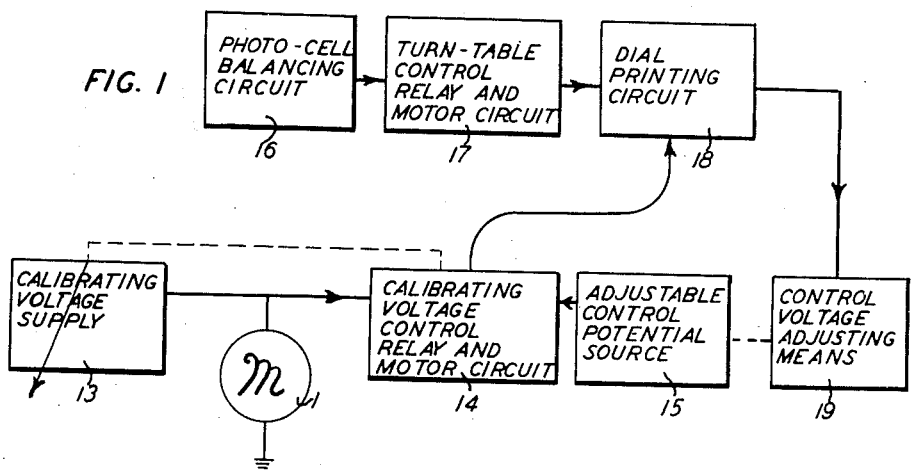
FIG. 1
FIG. 3
| FIG. 4 | FIG. 5 |
| FIG. 6 | FIG. 7 |
INVENTOR
F. W. SCHRAMM
BY *W.C.Parnell*
ATTORNEY

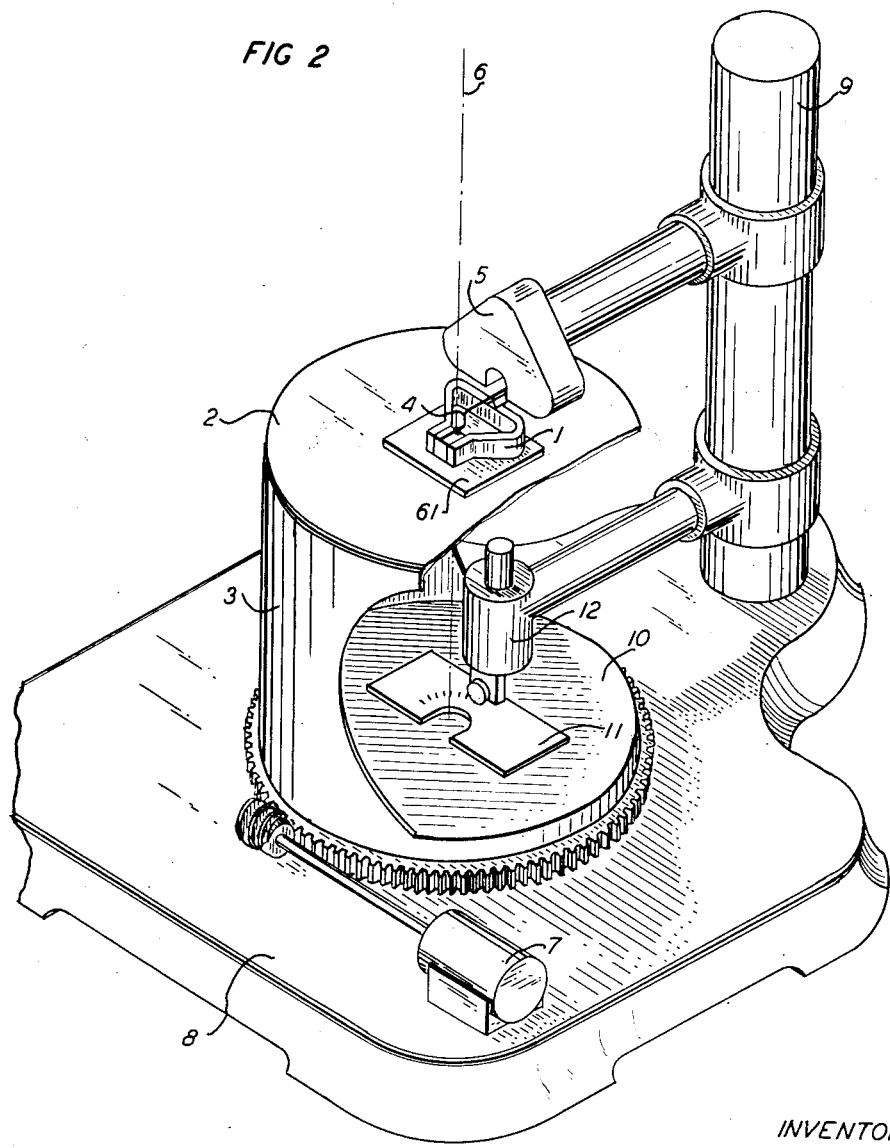

INVENTOR
F. W. SCHRAMM
BY
W.C. Parnell
ATTORNEY

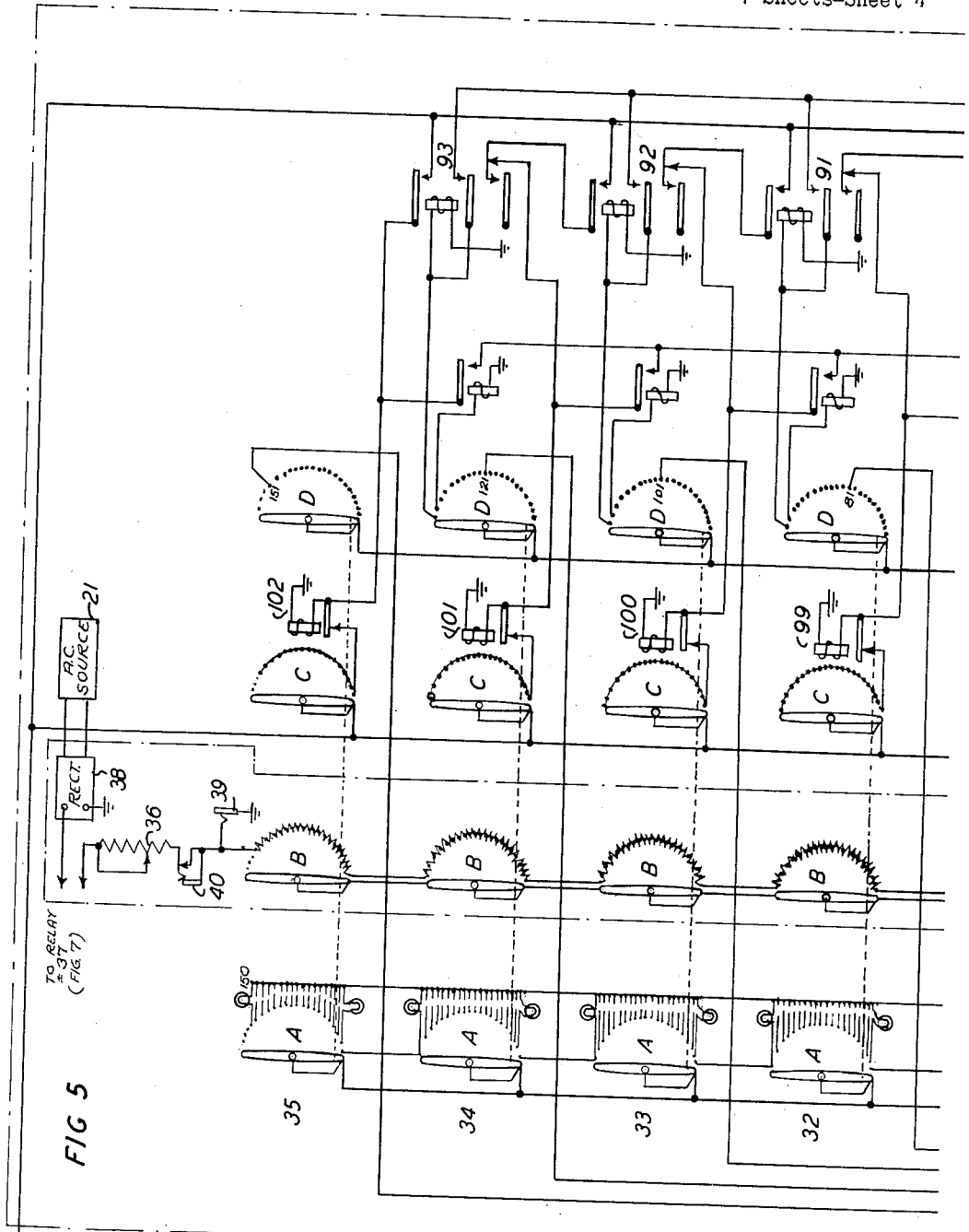

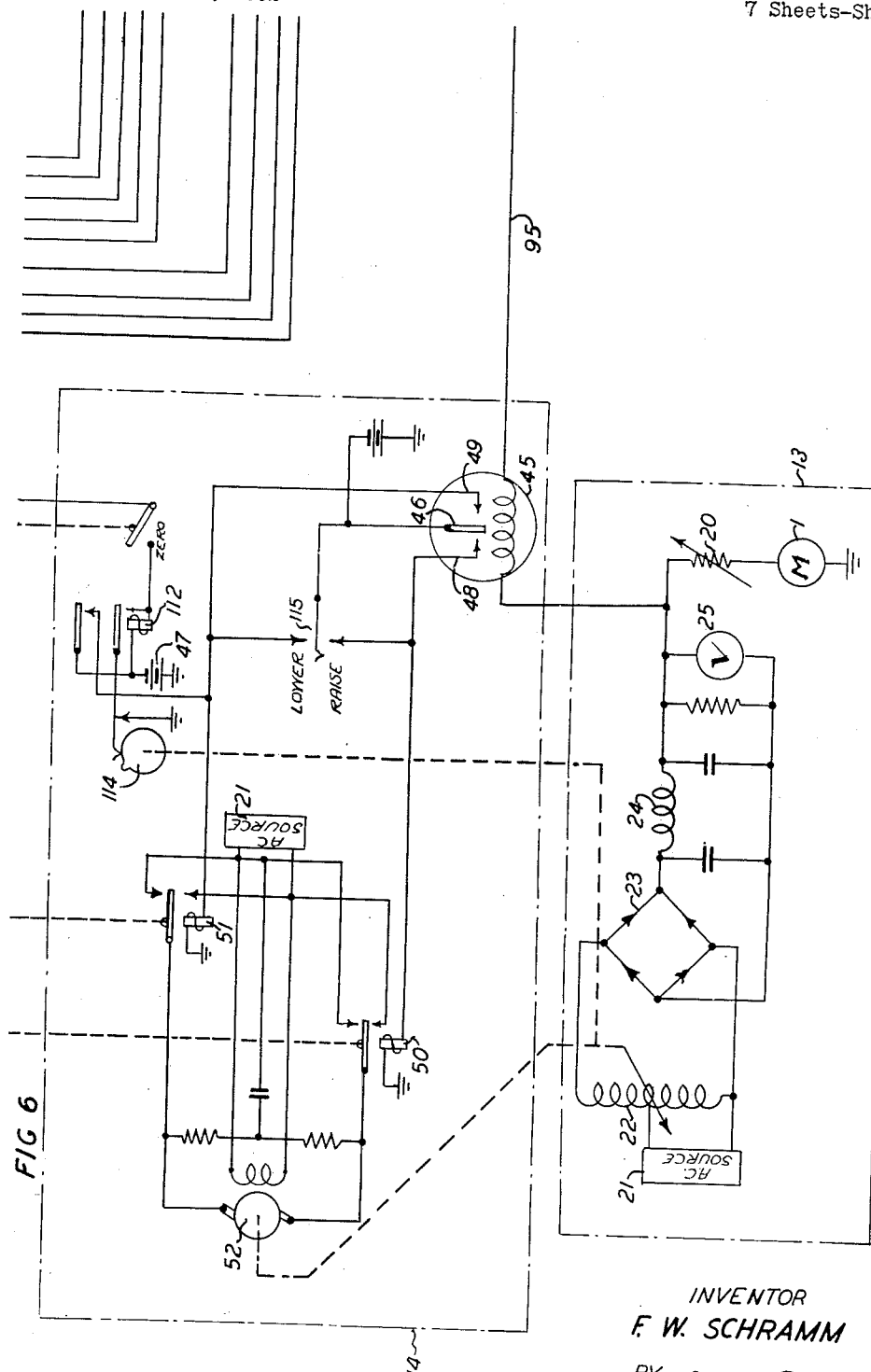

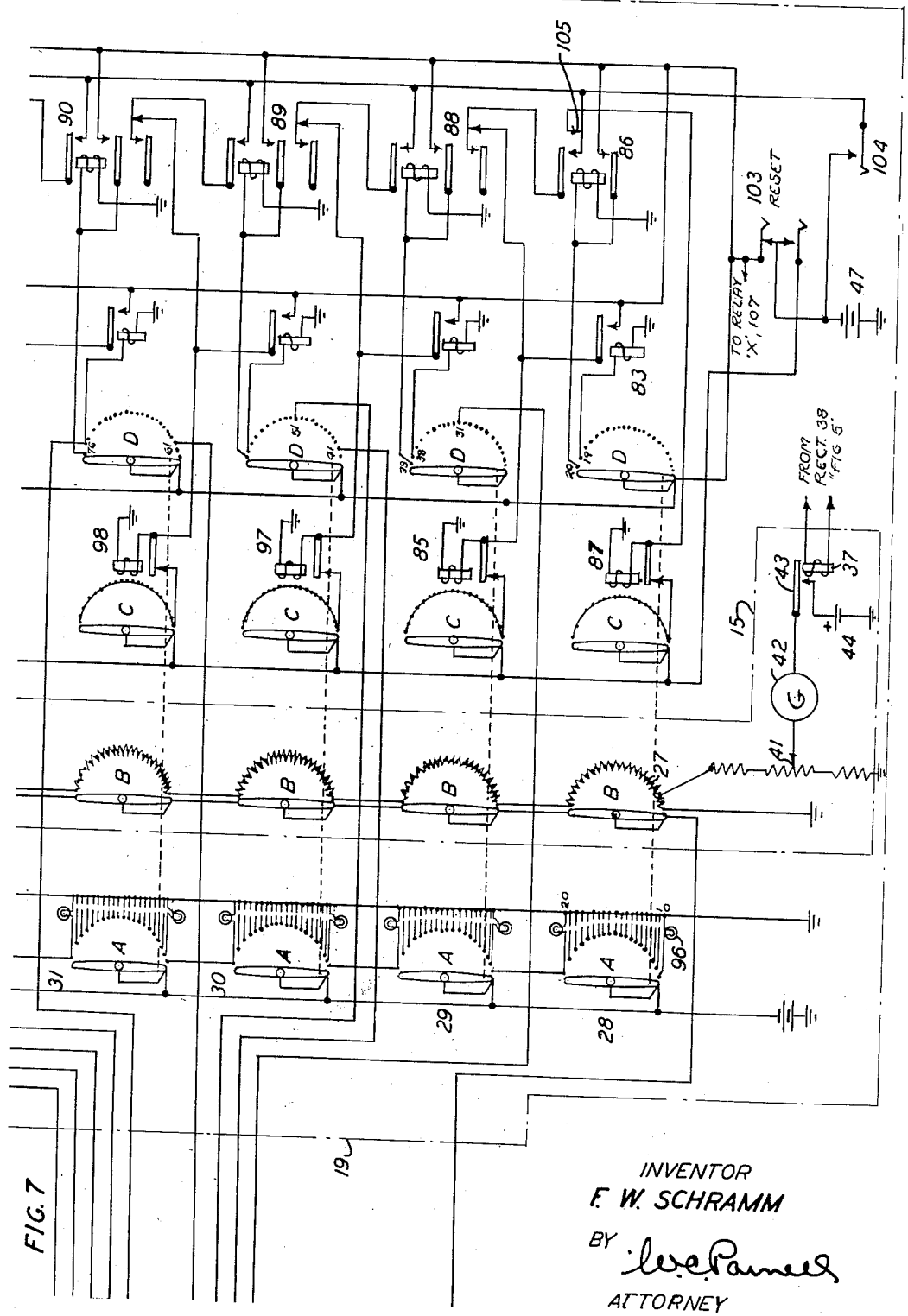

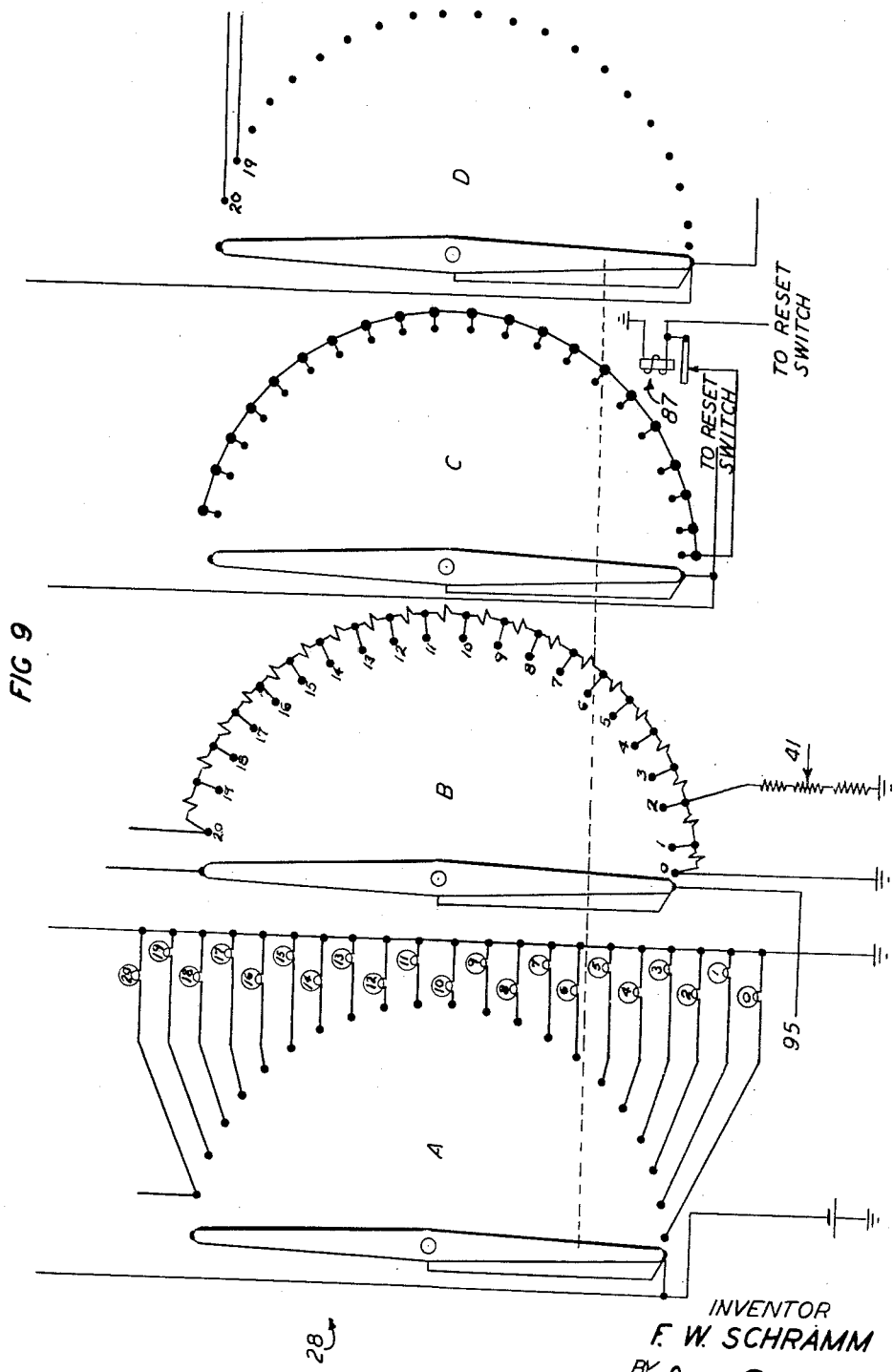

United States Patent Office 2,767,375
Patented Oct. 16, 1956

2,767,375

AUTOMATIC METER CALIBRATOR

Fred W. Schramm, Fanwood, N. J., assignor to Western Electric Company, Incorporated, New York, N. Y., a corporation of New York Application December 9, 1952, Serial No. 325,004

12 Claims. (Cl. 324—74)

This invention relates to a system for automatically calibrating and printing the scales of indicating instruments.

The calibration of a meter and the conversion of such calibration into a scale on its dial plate ordinarily requires a number of arduous manual operations such as mounting a standard linear scale on the meter, calibration at the cardinal points by comparison with a standard meter, recording of deviations or marking the scale and printing the scale from the recorded or marked values either manually or by various printing and sub-dividing devices. This calibration, besides being time consuming, is accurate only at the cardinal points.

It is, therefore, the general object of this invention to provide a system for automatically calibrating a meter at each division on its scale and simultaneously printing the scale on the dial plate in a fraction of the time now required.

In accordance with a preferred embodiment of the present invention, a meter to be calibrated is coaxially mounted on a turn-table with a blank dial plate in a corresponding position on the turn-table under a scale printing mechanism. A source of calibrating voltage is connected to the meter and for each division of the scale, the calibrating voltage is automatically balanced against a corresponding accurate control voltage. As the meter needle moves to register each increment of the calibrating voltage, it unbalances a photoelectric unit which causes rotation of the turn-table to restore balance and bring the dial into printing position. At the balance condition, the printing mechanism is actuated to stamp the scale line and the control voltage is then automatically switched to the value corresponding to the next scale division where the foregoing operations are repeated. The apparatus is preset to any required number of divisions and the calibration and printing proceeds automatically to completion.

Other objects and features of the invention will be more readily understood from the following detailed description when read in conjunction with the accompanying drawing in which:

Fig. 1 is a schematic block diagram of the system in accordance with the invention;

Fig. 2 is an isometric view of the turn-table on which a meter to be calibrated is mounted;

Fig. 3 is a diagram indicating the manner in which Figs. 4 to 7 may be placed together to form a complete circuit diagram;

Figure 4:
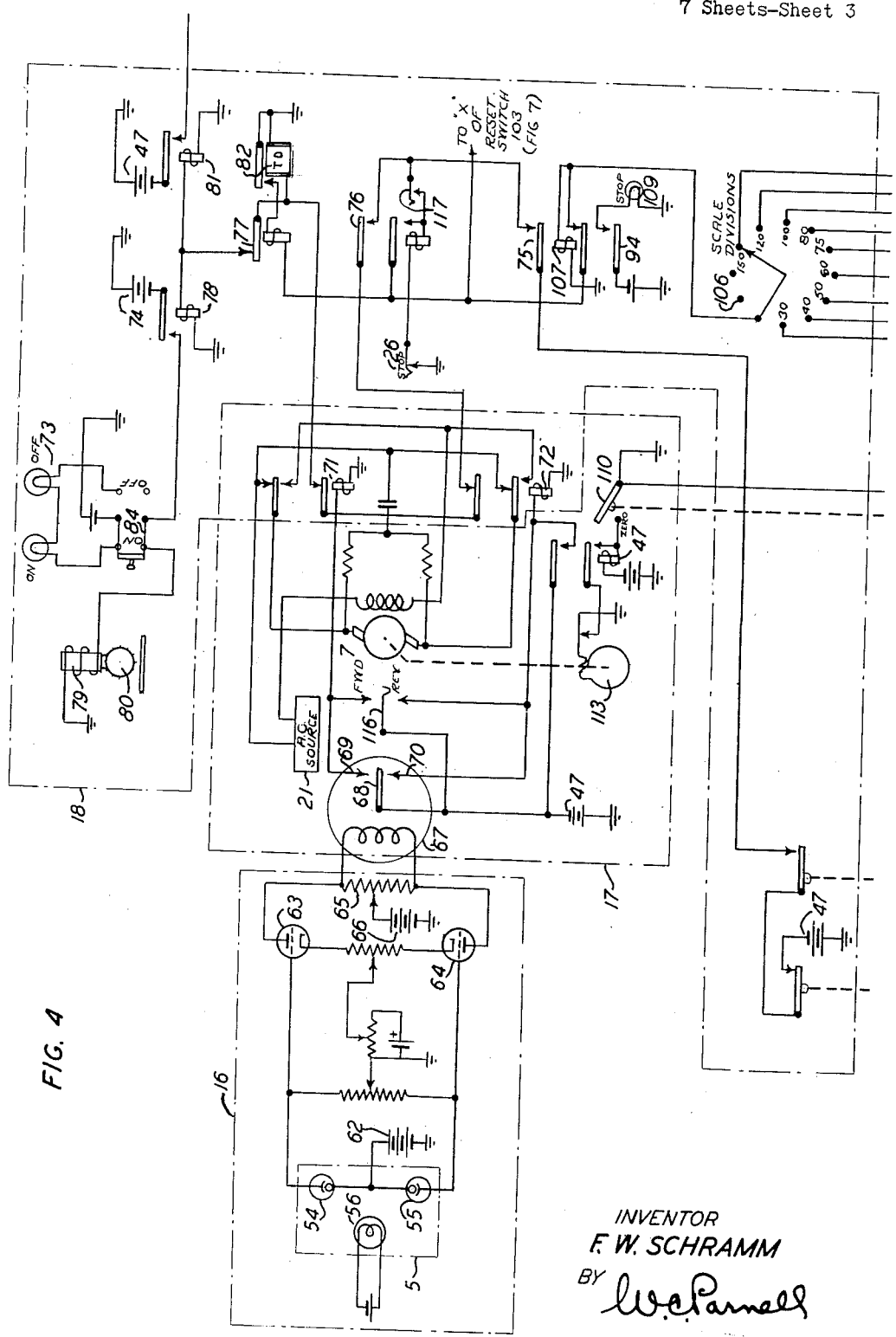

Figs. 4 to 7 inclusive, when placed as indicated in Fig. 3 constitute a detailed schematic circuit diagram of the system according to the invention;

Fig. 8 is a diagrammatic view of the photoelectric unit utilized in the turn-table; and Fig. 9 shows the contact connections of the four banks of the first selector switch.

Referring now to the block diagram of Fig. 1, the automatic calibrating system comprises basically a calibrating voltage supply 13 whose output potential is connected to both the meter 1, the scale of which is to be calibrated and printed, and a calibrating voltage polarized control relay and motor circuit 14. An adjustable control potential source 15 is also connected to the control relay circuit 14. An unbalance between the control potential and the calibrating voltage enables the control relay and motor circuit 14 to vary the calibrating voltage output until it matches the control potential.

While the calibrating voltage is being adjusted to match the control potential, the needle of the meter 1 under test moves with the changing calibrating voltage and a photoelectric cell balancing circuit 16 operates to drive the turn-table by means of the turn-table control relay and motor circuit 17 until the needle is brought to balance position at which time, when both the photoelectric cell circuit 16 and the calibrating voltage circuit 13 are respectively balanced, a marking or dial printing circuit 18 is actuated to print the division in its proper place on a blank meter dial plate. The dial printing circuit thereupon actuates control voltage adjusting means 19 for adjusting the calibrating voltage to its next step.

Meters are made in a wide range of types and sizes and with scales having from 30 to 150 divisions. In the present system, the printing mechanism is operated once for each division and the meter being calibrated is treated as a voltmeter with a range in volts equal to the number of its scale divisions. A meter to be calibrated is connected in the system in series with a decade resistance which is provided as an adjustable multiplier. This multiplier is set to the proper value from the following formula:

$$\left(\frac{\text{Number of Scale Divisions}}{\text{Full Scale Current of Meter}}\right) - (\text{Resistance of Meter}) = (\text{Multiplier Resistance}) \quad (1)$$

Referring now to Fig. 2, a meter 1 to be calibrated is mounted on an adapter plate 61 to the upper deck 2 of a rotatable support 3 so that the axis of the pivot of the meter needle 4 is in line with the axis 6 of the turn-table. A photoelectric cell unit 5 is mounted in fixed position on the stationary post 9 over the meter needle 4 and controls the axial position of the rotatable support 3 by energizing a reversible motor 7 mounted to the fixed base 8 and geared to the rotatable support 3. A blank dial plate 11 is mounted on the lower deck 10 in a position corresponding to that of the meter 1, with a solenoid operated printing mechanism 12, fixed to post 9, positioned over it.

In the detailed circuit diagram of Figs. 4 to 7, calibrating voltage, applied to meter 1 through the adjustable decade resistance 20, is obtained from an A. C. power source 21 through a motor driven induction regulator 22, which gives a smooth change of voltage from zero to double line voltage, a rectifier 23 and a filter 24. A voltmeter 25 is provided for visual check on the calibrating voltage output of the filter 24.

The highly accurate control potential source 15 comprises a potentiometer having 150 ten ohm resistances 27, accurate to ±0.1%, connected in series and between steps in a corresponding bank of each of eight (8) automatic selector switches 28 through 35 respectively, a rheostat 36 and the winding of a relay 37. This potentiometer is energized from a 150 to 175 volt regulated rectifier 38, one side of the rectifier and the potentiometer being connected to ground. An accurate 150 volts is obtained across the 150 ten ohm resistances by connecting a standardized voltmeter in jack 39 and adjusting rheostat 36 until it indicates exactly 150 volts. An ammeter jack 40 is also provided for making current checks.

At the ground end of the potentiometer a high resistance potentiometer 41 is bridged from the 2-volt step to ground (across 20 ohms resistance). The adjustable tap of this potentiometer is connected through a zero center galvanometer 42 and contacts 43 of relay 37 to the positive side of a standard cell 44. Potentiometer 41 is adjusted so that the galvanometer is balanced when an exact 150 volts appears across the 150 ten ohm resistances. Once the potentiometers have been set up with a standardized volt-meter, any variation in the voltage across the control potential source may be detected from an unbalance in galvanometer 42 and rheostat 36 can be adjusted to bring the galvanometer back to balance position. To avoid continuous drain from the standard cell 44, the winding of relay 37 is connected in series with the control potential source potentiometer to open the circuit at contacts 43 when the set is not in use.

The selector switches used in this system are of a standard type and have 21 positions per bank 0 to 20, besides a neutral position; therefore, eight (8) selector switches are used in tandem to cover the range of 150 divisions, the voltage for each of the 150 divisions being obtained from a corresponding position on the selector switches. These rotary stepping switches 28 through 35 comprise operating electro-magnetic actuators 87, 85, 97 through 102 respectively and 4 banks of contacts each (A, B, C and D) together with their associated wipers, the wipers for the 4 banks of each switch being mounted on a common shaft as shown schematically by the dashed lines in the drawing. These wipers are rotated over their associated bank contacts under control of their respective electro-magnets each time it becomes deenergized. A switch which operates in a similar manner is disclosed in Patent No. 1,693,027 issued November 27, 1928, to J. Erickson. Fig. 9 shows the detailed connections for the first selector switch 28, the other switches having connections similar to this. The transfer from one selector to the next without interruption is accomplished through contacts on bank D. As selector 28 moves to step 19, a circuit is closed through the winding of relay 83 (Fig. 7) to the source 47. When relay 83 operates, source 47 is connected through its contacts to the electro-magnetic actuator 85 of selector 29 which pulls up. When selector 28 moves from step 19 relay 83 releases, releasing actuator 85 and stepping selector 29 to its first position, which is directly connected to position 20 on bank B of selector 28 so that no break is permitted in the stepping sequence. At the same time on bank D of selector 28, source 47 is connected through step 20 to relay 86 which locks up. Operation of relay 86 connects the actuator 85 of selector 29 to the contacts of relay 81 in the printing or marking circuit 18 and at the same time releases the actuator 87 of selector 28 which steps to its neutral position, leaving relay 86 locked up. After the twentieth scale line is printed, selector 29 will move to step 21 which corresponds to the 0 step of the selector 28, selector 28 being inoperative since relay 86 is locked up. Successive steps are now made by selector 29 and the transfer to selector 30 is made in a similar manner on steps 38 and 39. Similar operation continues through to selector 35 and as the last step on each selector is reached, relays 86 and 88 through 93 lock their respective selectors out of the circuit.

As mentioned above, the resistors 27 of the control potential source 15 are serially connected between the steps of bank B of the eight selector switches, the last position of each selector switch being connected to the first position of the next. The different steps of the control voltage are obtained from the movable contact arms of the selector switches of bank B which are connected to the output lead 95.

The outputs from the calibrating voltage source 13 and the control potential source 15 are both connected to a polarized control relay 45, which may be of the Weston Model 30 voltmeter relay type. The armature 46 of the relay is connected to a relay energizing source 47 while the contacts 48 and 49 are connected through the windings of relays 50 and 51, respectively, to ground. Contacts are provided on relays 50 and 51 for supplying armature current to the calibrating voltage adjusting motor 52 when either one of these relays is operated, the polarity of the armature current and, therefore, the direction of rotation of motor 52 depending on which relay, 50 or 51, is energized.

In the photoelectric cell balancing circuit 16, two photoelectric cells 54 and 55 are arranged to receive light from source 56. Fig. 8 shows the light source 56 mounted in a chamber 57 which is provided with a mask 58. The mask, together with the opening of the chamber, confines the light to a narrow beam 59 which is directed to a double mirror 60. The light reflected from the mirror surfaces energizes the cells 54 and 55 which are equally spaced from the mirror 60 so that the same amount of light reaches each cell. With a meter to be calibrated mounted on the turntable, the meter needle 4 will, under balanced conditions, be at mid-position in the light beam so that equal amounts of light still reach the two cells. These cells 54 and 55 are arranged in an electrically balanced circuit, their anodes being connected together and biased from the D. C. plate supply 62; the cathodes being connected to the grids of each of a pair of vacuum tube amplifiers 63 and 64. The outputs of the two amplifier tubes are serially connected in opposition by a resistance 65 which is provided with an adjustable center tap connected to a source of plate voltage 66. Connected in parallel with the resistance 65 is the winding of a polarized control relay 67. An adjustable balancing circuit is provided across the cathodes of the photo cells 54 and 55 and an adjustable bias and balancing circuit is provided in the ground return connection of the cathodes of the amplifier tubes 63 and 64. When the meter needle 4 is in its balanced position, the photoelectric cell circuit is initially adjusted so that the output potential across the winding of the control relay 67 is zero.

The movable armature 68 of the control relay 67 is connected to the relay energizing source 47 and the contacts 69 and 70 are connected through the windings of relays 71 and 72 respectively to ground. Contacts are provided on these relays for supplying armature current to the turn-table adjusting motor 7 when either one of relays 71 or 72 is operated, the polarity of the armature current and therefore, the direction of rotation of motor 7 depending on which relay, 71 or 72, is energized.

In the scale printing or marking circuit 18, source 47 is serially connected through back contacts of relays 50 and 51, back contacts 75 of relay 107, energized contacts of relay 76, back contacts of relays 72 and 71, back contacts of relay 77, the winding of relay 78 to ground. Relay 78 is provided with contacts for connecting source 74 to the stamping solenoid 79. A printing wheel 80 having the proper succession of cardinal and sub-cardinal scale lines is mounted on the stamping head of the solenoid 79. A manually operated switch 84, having an associated "On"–"Off" indicator lamp circuit 73, is provided for opening the solenoid excitation circuit to prevent printing if so desired. The winding of relay 81 is simultaneously energized with that of relay 78 and actuates the selector switches 28 through 35. When the circuit to relays 78 and 81 is closed, relay 82 is also energized. This is a time delay relay which operates in about two seconds and closes the circuit of relay 77 which, in turn, opens the marking circuit thereby releasing relays 78 and 81.

Indicator lamps 96 having one side grounded and the other side connected to the selector switch contacts of bank A are arranged in numbered positions corresponding to the position of the potentiometer resistors 27. These lamps are energized through the movable contact arms and indicate which step of the selector switches is making contact.

All of the contacts of bank C of each selector switch, with the exception of the neutral position, are short circuited to provide for the progressive actuation of each selector by making a through path for energizing the actuators 87, 85, and 97 through 102 to the source 47 through the contacts of relay 81 of the marking circuit 18.

"Reset" key 103 is provided for returning all locked up relays and selectors to normal before a meter calibration is started. After key 103 has been actuated and returned to normal position, key 104 is momentarily actuated to connect source 47 to the actuator 87 of selector 28 through contacts 105 on relay 86 to step the selector 28 to its first, the zero scale division step.

In the marking circuit 18, "Scale Divisions" switch 106 having settings for 30, 40, 50, 60, 75, 80, 100, 120, 150 divisions has contact connections to bank D of the selector switches, terminals 31, 41, 51, 61, 76, 81, 101, 121 and 151, respectively. The switch is set to the number of divisions required for the scale and when the last line has been printed, relay 107 is actuated when the selector moves to its next step by connecting the source 47 to the winding of relay 107. This opens the printing or marking circuit 18 and another contact on relay 107 connects source 94 to the "Stop" indicator lamp 109. Scale printing can be stopped whenever desired by throwing key 26 to its "Stop" position, which breaks the lock up circuit of relay 76 thereby opening the marking circuit.

A zero switch 110 is provided to initially drive the turntable motor 7 and the calibrating voltage adjusting motor 52 to approximately zero or starting position. The momentary closing of switch 110 to "Zero" position operates relay 111 which locks up and operates relay 72 to start the motor 7. When the turn-table is driven to "Zero" position, a cam 113 driven by the turn-table opens the lock-up circuit thereby releasing relay 72 and stopping motor 7. Relay 112 is also energized when the zero switch 110 is thrown and, similar to relay 111, it has lock-up contacts as well as contacts for connecting relay 51 to source 47 to drive motor 52. When the induction regulator 22 is driven to "Zero" position, a cam 114, driven by motor 52 breaks the lock-up circuit of relay 112 to release relay 51 thereby stopping motor 52.

For initial set up, manually operated keys 115 and 116 are provided for energizing relay 51 or 50 and relay 71 or 72, respectively, in order to raise or lower the control voltage or to turn the turn-table in either direction.

To start the automatic printing sequence, key 117 is closed to actuate relay 76 of the marking circuit 18 by connecting it to source 47; once operated, lock-up contacts connect the relay winding to source 47 through the reset key 103.

*Operation*

In calibrating a meter, the decade resistor 20 is set to its proper value as determined from Equation 1. The scale division switch 106 is next adjusted to the proper setting depending on the number of divisions to be printed. A printing wheel 80, to give the proper succession of cardinal and sub-cardinal scale lines, is then mounted on the stamping head of solenoid 79. The meter 1 and dial plate 11 are now mounted on the turn-table platforms 2 and 10, respectively, and connections made to the meter. To bring the turn-table to approximately starting position, the "Zero" key 110 is momentarily operated. By means of the manually operated key 116, the turn-table is operated so that the needle 4 is in approximate balanced position with respect to photo cell unit 5. The photo cell circuit is then energized in order to reach the exact balanced position. This is "Zero" position on the dial.

Also with the momentary operation of the "Zero" key 110, the calibrating voltage is driven to approximately zero volts. The "Reset" key 103 is operated to be sure that all relays and selectors are returned to normal and inoperated positions. By operating key 104 the actuator 87 of selector 28 is pulled up and when this key 104 is released, the selector is stepped to position "0" as indicated by lamp "0" lighting. The voltmeter relay 45 is then connected to ground on step "0" of the control potential source 15; the armature 46 of this relay will then make contact with one of the contacts 48 or 49 to operate the motor driven induction regulator 22 until the calibrating voltage is reduced to zero, the ground potential of position "0." Except for the contacts through relay 76 the control circuit is now closed and the set is ready to start calibration.

To start the printing operation, key 117 is now operated momentarily causing relay 76 to lock up and thereby close the marking or printing circuit. Relays 78 and 81 are thereby operated closing the circuit to the stamping solenoid which prints the zero line and relay 81 closes the circuit from battery 47 through the break contacts on relay 86 to the actuator 87 of selector 28 which pulls up. When the circuit to relays 78 and 81 is closed, relay 82 is also energized. After its time delay, the contacts on relay 82 close to energize relay 77 which in turn opens the control circuit to release relays 78 and 81. The opening of the contacts on relay 81 opens the circuit for the electro-magnetic actuator 87 to de-energize it and, therefore, step the selector switch 28 to position 1 whereupon lamp 1 lights and lamp "0" goes out. Armature 46 of control relay 45 immediately engages contact 48 to operate relay 50 and thereby open the control circuit. Delay acting relay 82 releases, releasing relay 77 but the marking circuit has meantime been opened by relay 50 so that no stamping occurs. Both the calibrating voltage adjusting motor 52 and the turntable motor 7 will operate to re-balance and bring control relays 45 and 67, respectively, back to the neutral positions. When both control relays are again in neutral position, i. e., when all movement of induction regulator and turn-table has ceased, the stamp again operates, the selector 28 steps to position 2 and the process is repeated for each step. At the completion of the meter scale, after the last line has been printed, relay 107 is operated when the selector moves to the next step. This relay locks up, opens the control circuit and lights the "Stop" lamp 109. After the meter and dial plate have been removed from the turn-table, the selectors may be returned to normal by operating the "Reset" key 103 and the turn-table returned to its starting position by operating the "Zero" key 110.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An automatic meter calibrator comprising a variable source of calibrating voltage connected to a meter to be calibrated, a source of control voltage, means for progressively adjusting the control voltage in predetermined steps, means operative at each adjusted value of the control voltage for varying the calibrating voltage to match the control voltage, a turn-table supporting the meter to be calibrated and a dial plate for the meter, means controlled by the response of the meter to the matched calibrating voltage at each adjusted step for producing a corresponding rotary adjustment of the turn-table, scale printing mechanism for the dial plate and means operated after each adjustment of the turn-table for actuating the printing mechanism and the control voltage adjusting means.

2. A calibrator according to claim 1 in which the source of control voltage comprises a plurality of serially connected equal resistances, a source of constant voltage applied to the ends thereof and means for producing across the plurality of resistances a potential equal to the number of equal resistances times the voltage required to deflect the meter needle one scale division.

3. A calibrator according to claim 1 in which the source of control voltage comprises a plurality of serially connected equal resistances connected in tandem with a rheostat, a source of constant voltage applied to the ends of the tandem arrangement, the rheostat being adjusted to make the voltage across the plurality of resistances equal to the number of equal resistances times the voltage required to deflect the meter needle one scale division.

4. A calibrator according to claim 1 in which the source of control voltage is obtained from a plurality of serially connected equal resistances connected in tandem with a rheostat, a source of constant voltage applied to the ends of the tandem arrangement, the rheostat being adjusted to make the voltage across the plurality of resistances equal to the number of equal resistances times the voltage required to deflect the meter needle one scale division, a potentiometer bridged across a portion of the series arrangement and means for comparing the potential across the potentiometer with a source of known potential.

5. A calibrator according to claim 1 in which the source of control voltage comprises a plurality of serially connected equal resistances, a source of constant voltage applied to the ends thereof, means for producing across the plurality of resistances a potential equal to the number of equal resistances times the voltage required to deflect the meter needle one scale division, a potentiometer bridged across a portion of the series arrangement and means for comparing the potential across the potentiometer with a source of known potential.

6. A calibrator according to claim 1 in which the source of control voltage comprises a plurality of serially connected equal resistances, a source of constant voltage applied to the ends thereof, means for producing across the plurality of resistances a potential equal to the number of equal resistances times the voltage required to deflect the meter needle one scale division and a multi-contact position selector switch having a movable contact arm, the junctions between the resistances being connected to the switch and the control voltage being derived from the movable contact arm as it engages the switch contacts.

7. A calibrator according to claim 1 in which the source of control voltage comprises a plurality of serially connected equal resistances, a source of constant voltage applied to the ends thereof, means for producing across the plurality of resistances a potential equal to the number of equal resistances times the voltage required to deflect the meter needle one scale division, a plurality of serially connected multiple position selector switches having movable contact arms, the resistances being connected between the contacts of the switches, the control voltage for each successive scale division being derived from the movable contact arms as they progressively engage the contacts and means for energizing the next selector switch operative when one movable arm moves to its last position.

8. An automatic meter calibrator comprising a variable source of calibrating voltage connected to a meter whose dial plate is to be calibrated and printed, means for progressively adjusting the calibrating voltage in pre-determined and discontinuous steps to correspond to successive scale divisions, a turn-table supporting the meter to be calibrated and a blank dial plate for the meter, means controlled by the adjusted calibrating voltage of each step for producing a corresponding rotary adjustment of the turn-table and for stopping the turn-table at an adjusted position, scale printing mechanism for the dial and means operated after the turn-table is stopped at an adjusted position for actuating the printing mechanism and the means for adjusting the calibrating voltage.

9. An automatic meter calibrator comprising a variable source of calibrating voltage connected to a meter whose dial plate is to be calibrated and printed, means for progressively adjusting the calibrating voltage in pre-determined and discontinuous steps to correspond to successive scale divisions, a turn-table having a stationary base and a rotatable support for both the meter and the dial plate, a driver for the rotatable support, control means for the driver associated with the needle of the meter to actuate the driver to rotate the support an amount corresponding to the meter deflection caused by the adjusted calibrating voltage and for stopping the support at an adjusted position, scale printing means for the dial plate supported by the base and means operated after the support is stopped at an adjusted position for actuating the printing mechanism and the calibrating voltage adjusting means.

10. An automatic meter calibrator comprising a variable source of calibrating voltage connected to a meter whose dial plate is to be calibrated and printed, means for progressively adjusting the calibrating voltage in pre-determined and discontinuous steps of equal increments to correspond to successive scale divisions, a turn-table having a stationary base and a rotatable support for both the meter and the dial plate, and means for mounting the meter with the pivot axis of the meter needle coinciding with the axis of the support, a driver for the rotatable support, control means for the driver associated with the needle of the meter to actuate the driver to rotate the support an amount corresponding to the meter deflection caused by the adjusted calibrating voltage and for stopping the support at an adjusted position, scale printing means for the dial plate supported by the base and means operated after the support is stopped at an adjusted position for actuating the printing mechanism and the calibrating voltage adjusting means.

11. An automatic meter calibrator comprising a variable source of calibrating voltage connected to a meter whose dial plate is to be calibrated and printed, means for progressively adjusting the calibrating voltage in pre-determined and discontinuous steps of equal increments to correspond to successive divisions, a rotatable member having a first support for the meter, means for mounting the meter with the pivot axis of the meter needle coinciding with the axis of the member, and a second support for the dial plate for the meter, spaced from and in fixed relation to the first support along the axis of the member, a driver for the rotatable member, control means for the driver associated with the needle of the meter to actuate the driver to rotate the member an amount corresponding to the meter deflection caused by the adjusted calibrating voltage and for stopping the member at an adjusted position, scale printing means for the dial plate supported by the base and means operated after the member is stopped at an adjusted position for actuating the printing mechanism and the calibrating voltage adjusting means.

12. A calibrator according to claim 9 in which the control means for the driver is actuated by a normally balanced photoelectric cell circuit which is unbalanced by the deflection of the meter needle.

References Cited in the file of this patent

UNITED STATES PATENTS

| 1,984,688 | Murray | Dec. 18, 1934 |
| 2,275,977 | Means | Mar. 10, 1942 |
| 2,300,803 | Pattee | Nov. 4, 1942 |
| 2,449,093 | Weingarten | Sept. 14, 1948 |